United States Patent [19]

Braley

[11] 4,418,712

[45] Dec. 6, 1983

[54] OVERFLOW CONTROL SYSTEM

[76] Inventor: Charles A. Braley, P.O. Box 3960, Torrance, Calif. 90510

[21] Appl. No.: 282,499

[22] Filed: Jun. 13, 1981

Related U.S. Application Data

[62] Division of Ser. No. 112,641, Jan. 16, 1980, Pat. No. 4,380,243.

[51] Int. Cl.³ .................. H01H 35/18; H01H 29/06
[52] U.S. Cl. .................................. 137/312; 68/208;
73/308; 73/313; 134/57 D; 134/113; 137/387;
137/429; 137/558; 200/61.04; 200/83 WM;
200/84 R; 307/118; 307/252 E; 340/604;
340/624; 361/178
[58] Field of Search .............. 68/208; 134/57 D, 57 R,
134/113; 137/312, 387, 429, 558; 73/307, 308,
313; 200/61.04, 61.05, 61.06, 84 R, 83 WM;
307/118, 252 E; 340/604, 623, 624; 361/178

[56] References Cited

U.S. PATENT DOCUMENTS

| 3,185,789 | 5/1965 | Gunther | 340/624 |
| 3,255,324 | 6/1966 | Ovshinsky | 307/252 E |
| 3,264,627 | 8/1966 | Austin | 340/624 |
| 3,464,437 | 9/1969 | Zane | 200/84 R |
| 3,874,403 | 4/1975 | Fischer | 200/61.04 |
| 4,069,837 | 1/1978 | Jirasek | 68/208 |

Primary Examiner—George L. Walton

[57] ABSTRACT

An overflow control system for use with home appliances such as washing machines, incorporating conventional stand pipe which receives the outlet conduit from the appliance, the stand pipe being provided with an attachment having a displacement, conductivity or a pressure sensor installed for sensing the height of liquids in the stand pipe. This stand pipe may be vertically connected to the sewage line outlet found in a home and the signals from the sensors may be used to shut off the power to the appliance and to excite an alarm. Connected in parallel with the sensors may be a moisture sensor deployed under the appliance which again shuts the power off whenever the machine is inadvertently filled beyond its limits or when leakage occurs.

1 Claim, 11 Drawing Figures

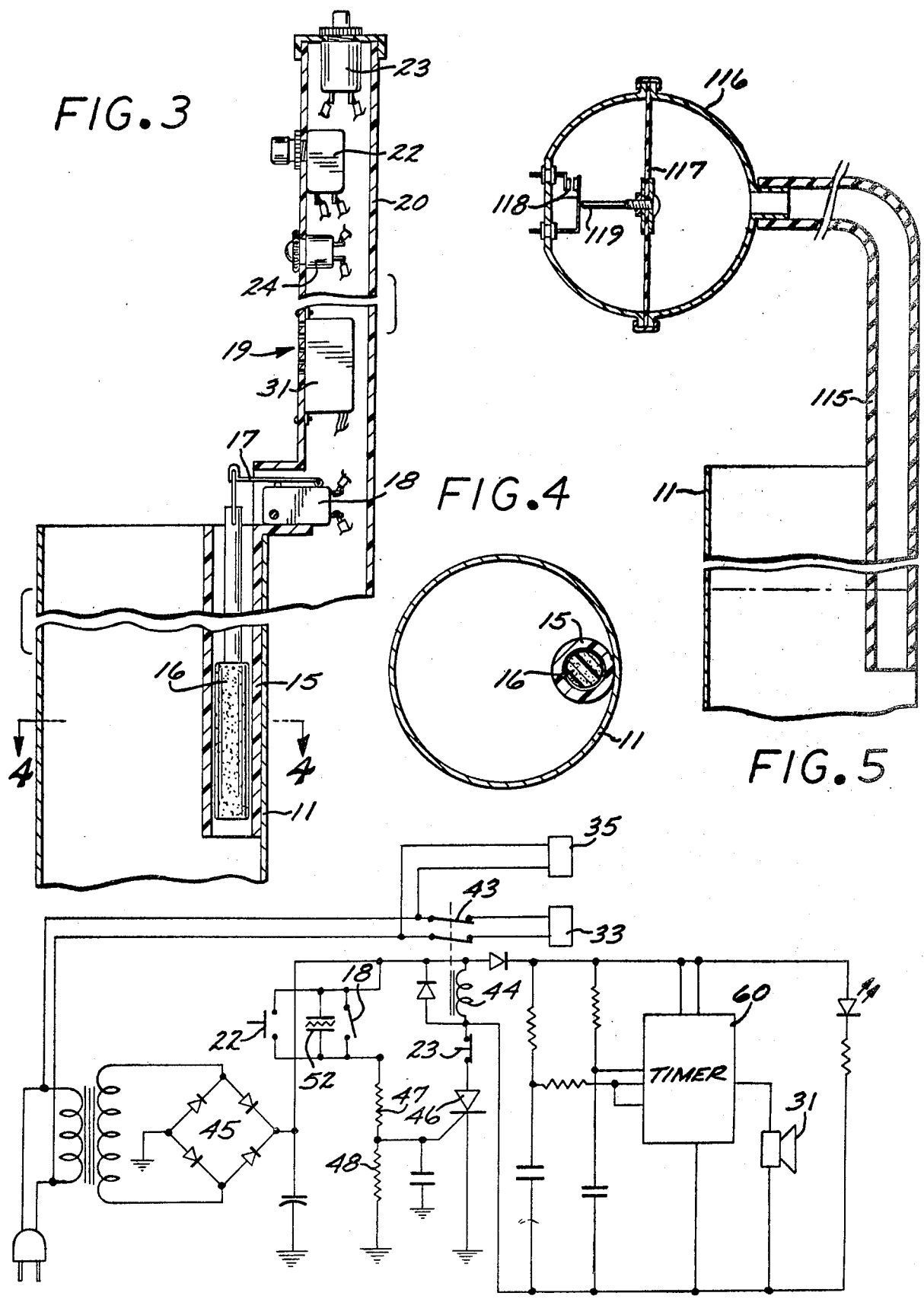

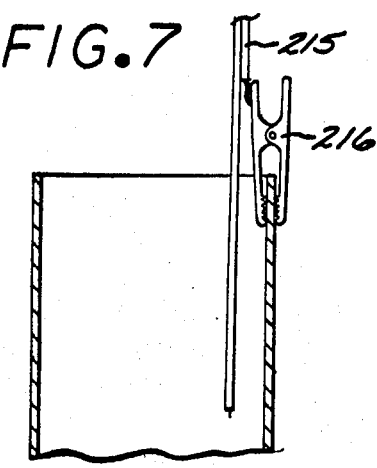
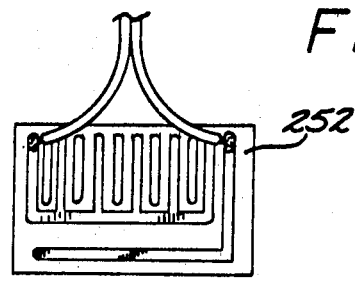
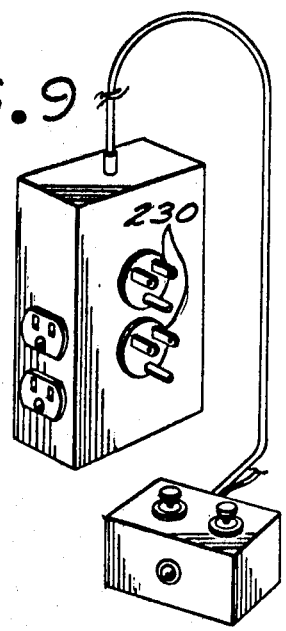
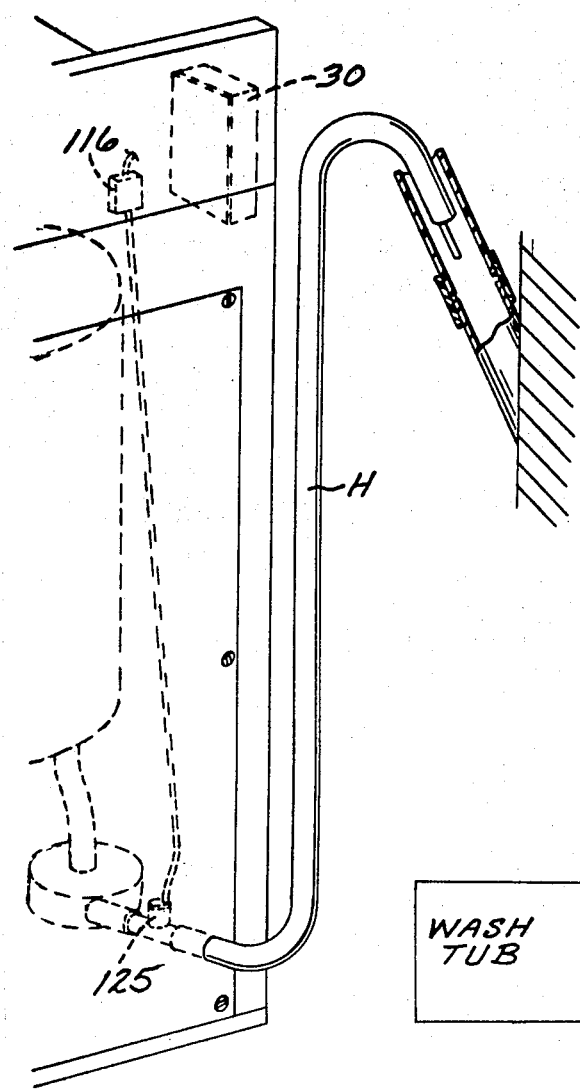
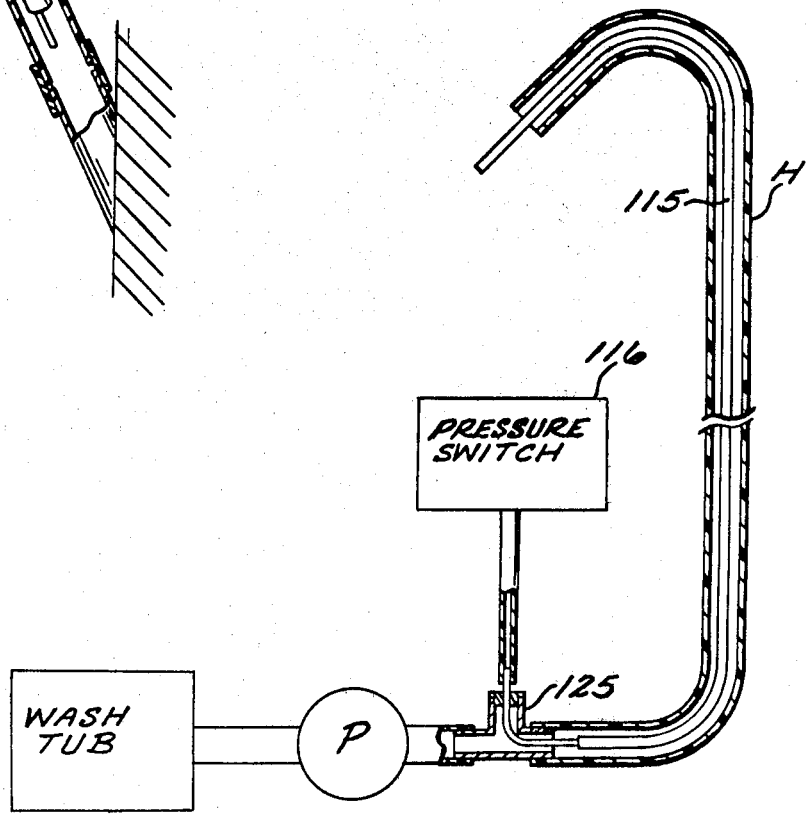

OVERFLOW CONTROL SYSTEM

This is a division of application Ser. No. 112,641, filed Jan. 16, 1980, now U.S. Pat. No. 4,380,243.

BACKGROUND OF THE INVENTION

1. Field of the Invention

The present invention relates to protective devices, and more particularly to alarms for shutting off appliances and rendering noticeable the malfunction thereof.

2. Description of the Prior Art

One of the more common failures occurring in a mechanized household is the failure of a washing machine. Typically a washing machine is connected to the household waste system through an antisiphon connection which allows for leakage in cases where the waste line is clogged. The automatic features of a washing machine, on the other hand, are particularly suited for unattended use and the inadvertent clogging of the waste line almost always results in spillage of large quantities of water. The alternatives left to the user were quite limited. As one option the user may monitor the machine very closely and stop the operation thereof when the first signs of spillage become evident. Alternatively, adequate precautions have to be taken and the waste line has to be constantly checked for possible obstruction. Most of these options are time-consumming and defeat the purpose of the automated appliance. It is for these reasons that various devices have been provided in the past which in one way or another monitor the machine and shut off the operation thereof in the event of failure.

The instances of water spillage in an automated washer occur primarily as result of the failure of the level sensing circuits therein or because of waste line obstruction. In most instances the prior art corrective measures are primarily directed to modifications in the drain structure itself which are often not successful or too complex.

SUMMARY OF THE INVENTION

Accordingly, it is the general purpose and object of the present invention to provide an overflow protection system adapted which is universally configured and which disrupts the power to the appliance on the occurrence of a failure.

Other objects of the invention are to provide an overflow detection system conformed for installation subjacent an appliance and at the drain connections thereof.

Yet additional objects of the invention are to provide an overflow protection device useful with an appliance which is conveniently installed, reliable in use, and requires little maintenance.

Briefly these and other objects are accomplished within the present invention by providing an attachment for the stand pipe normally extending from conventional sewer outlets used for draining washing machines and similar appliances. This attachment includes on the interior thereof either a displacement, a pressure, or a conduction sensor for detecting fluid levels collected in the stand pipe. The level sensor may be connected to a circuit breaker housed in an enclosure which is conformed for attachment to the conventional wall outlet. This circuit breaker, when triggered by an excessive liquid level in the stand pipe, will disrupt the power to the appliance. Concurrently, a moisture sensor may be placed underneath the appliance to similarly trigger the circuit breaker. The circuit breaker may be provided with an audio and visual alarm to indicate to the user that a failure has occurred.

BRIEF DESCRIPTION OF THE DRAWINGS

FIG. 3 is a sectional view, in detail, illustrating a level sensing arrangement useful with the invention herein;

FIG. 4 is a sectional top view taken along line 4—4 of FIG. 3;

FIG. 5 is yet another implementation of a level sensor useful with the invention herein;

FIG. 6 is a circuit diagram of an interruption circuit for use with the invention herein;

FIG. 7 is a side view illustrating an alternative level sensor useful herein;

FIG. 8 is a top view detail of a moisture sensor useful herein;

FIG. 9 is a perspective illustration of an enclosure adapted to be mounted on a wall outlet;

FIG. 10 is a detail illustration of an alternative arrangement of parts of the invention herein, for installation thereof in the appliances; and FIG. 11 is a sectional view of a pipe detail useful with the arrangement shown in FIG. 10.

DESCRIPTION OF THE PREFERRED EMBODIMENT

Figure 1:
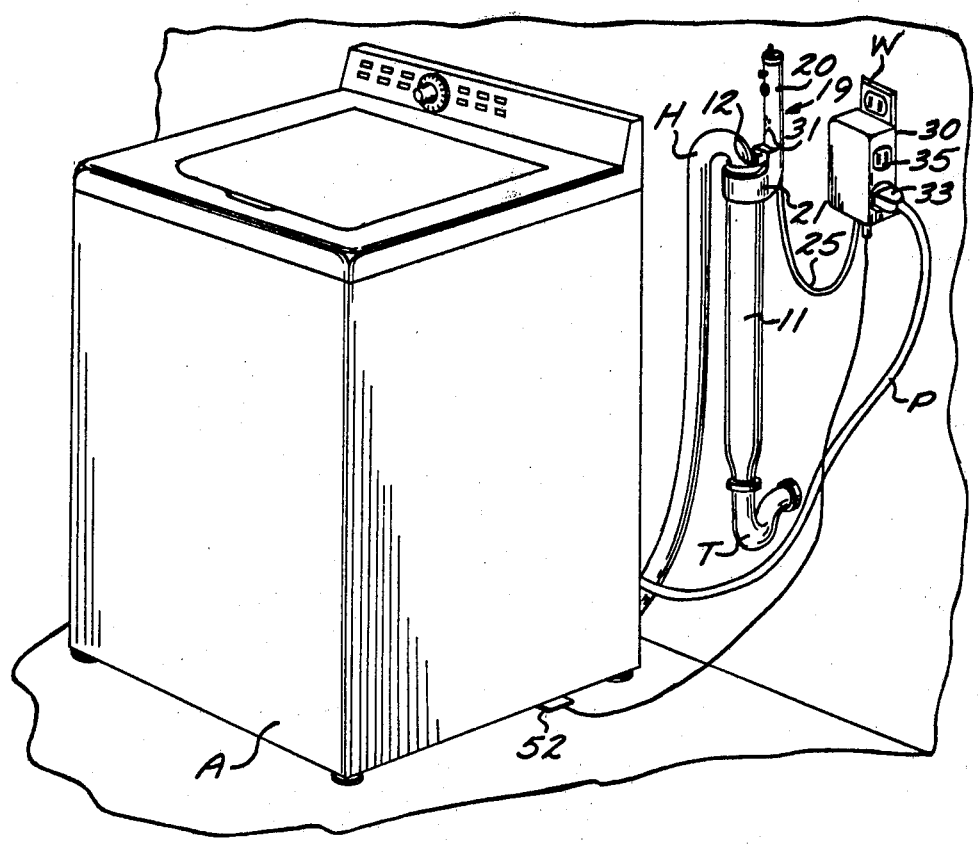
FIG. 1 is a perspective illustration of a washing machine provided with the inventive overflow protection system.

As shown in FIG. 1 an appliance A typically includes a power cord P adapted for connection into any conventional wall outlet and a drain hose H through which any waste liquid may be drained into a conventional trap T arrangement connected to thw sewer line. This appliance may take the form of an automatic clothes washer or a dishwasher and in the course of use thereof receives predetermined quantities of water from conventional water supplies (not shown) and after this water is used for the cleaning function it is evacuated through the drain hose H. To preclude the possibility of siphoning between the appliance A and the trap T a vacuum break is normally included in the drain connection, the typical vacuum break taking the form of a gap around the connection of hose H to the sewage line.

Automatic washers, in their use, typically pass large amounts of lint and other particulate debris in the course of draining. Quite often, therefore, any pre-existing obstruction in the sewage line will cause a build-up of this particular matter with the result that overflow occurs. In conventional practice the draining of the appliance A is typically achieved by pumping and the pressure levels therefore are often high. At these pressures, any obstruction is quickly exacerbated both by the flow rate and by the accumulation of debris. The resulting spills are thus quite pronounced and destructive in character.

To avoid these spills or to minimize their scope it is contemplated to provide in the present invention a modification of a stand pipe 11 joined at the bottom end thereof to the trap T and including an opening 12 at the top thereof into which the hose H is received. As stated above, to preclude siphoning, opening 12 is substantially larger than the exterior diameter of hose H, thus presenting a gap through which air can be drawn. Attached to the top end of stand pipe 11 is an attachment 19 conformed to provide the features herein. As shown in detail in FIG. 3 a tube 15 extends for immersion in water that may collect in the stand pipe 11, extending from the attachment 19 into the stand pipe interior. Tube 15 is open at both ends and receives on the interior thereof a weighted rod 16 which at the upper end is suspended from a lever 17 disposed to articulate a switch 18. Switch 18 is a push-to-open switch spring loaded to raise lever 17 when rod 16 is partly immersed in water. The spring rate of switch 18 and the displacement volume of rod 16 are selected such that upon the raising of the water level in the stand pipe 11 is switched to close. In this manner a level detector is formed which, according to the weight and volume selection of rod 16, will trip the switch at a desired water level.

Both the switch 18 and the tube 15 extend from a housing 20 which is supported from a collar 21 deployed around the upper end of stand pipe 11. Housing 20 includes on the interior thereof a plurality of test and reset switches 22 and 23, an indicating light 24, and an audio alarm 31.

Figure 2:
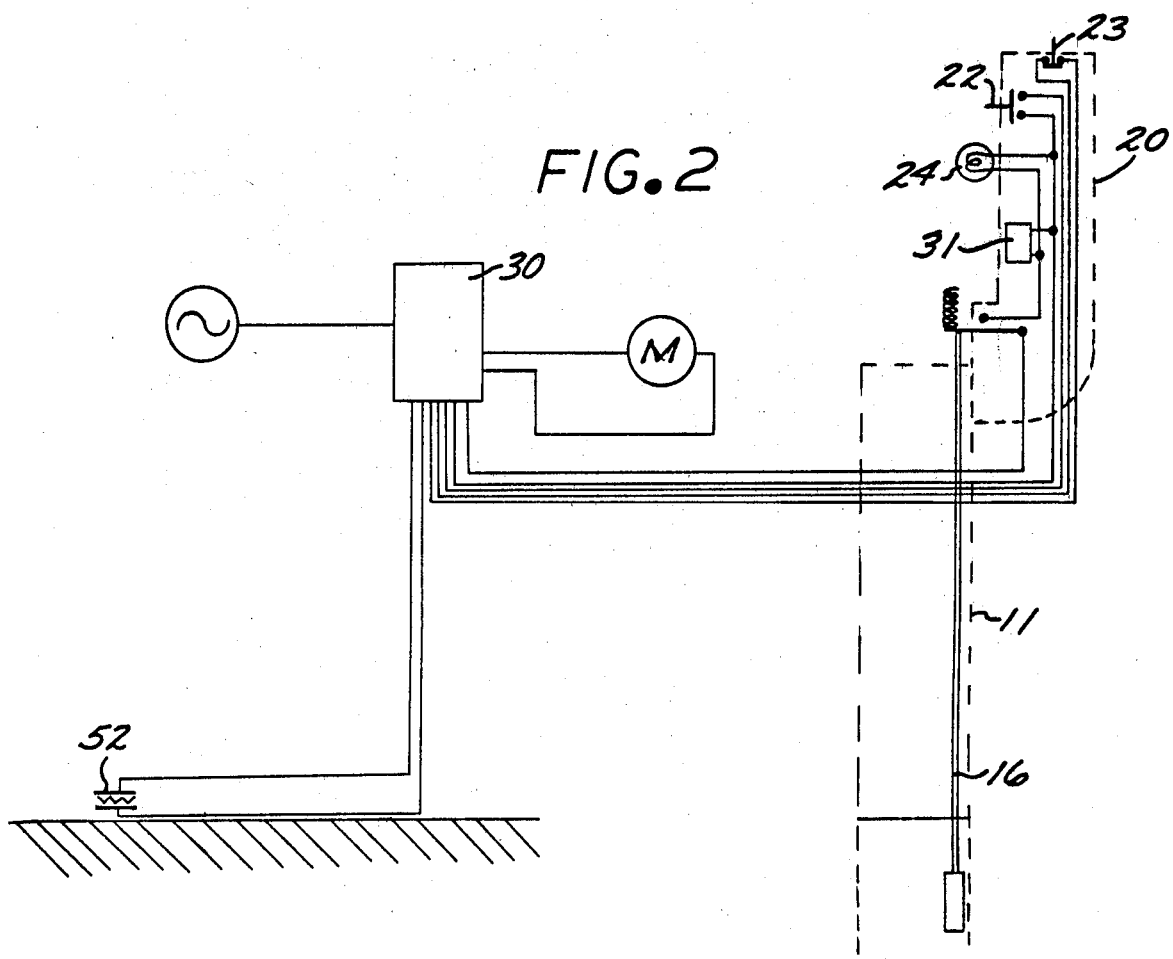
FIG. 2 is a wiring diagram of the overflow protection system disclosed herein.

As shown in FIGS. 1, 2 and 6, the signals generated by the level sensor and the test and reset switches set out above are all brought out by way of a conduit 25 to an enclosure 30. Enclosure 30 includes an electrical outlet 33 for receiving the end of the power cord P. In this form enclosure 30 may be provided with the necessary male connectors which may be inserted into any wall outlet, shown herein as wall outlet W. In addition to the foregoing plug receptacle 33, enclosure 30 may include yet another outlet 35 directly tied to the wall receptacle W. Depending on packaging convenience enclosure 30 may also include the foregoing test and reset switches 22 and 23, the audio alarm 31 and an indicating light 32. In this form the power conveyed through the lead P to the appliance A may be controlled according to the level within stand pipe 11 as shown in FIG. 2 and 6. Specifically, as shown in these figures, outlet 33 is tied in series with a relay switch assembly 43 pulled open by a relay coil 44. The input to the switch assembly 43 may originate at the wall outlet, receptacle 35 being directly tied thereto.

Coil 44 is connected in series between the positive terminal of a rectifier 45 and the anode of a silicon controlled rectifier 46, across the foregoing reset switch 23. The gate terminal of SCR 46, on the other hand, is tied to the dividing junction of a voltage divider comprising resistors 47 and 48, which in turn are connected to the high side of bridge 45 across switch 18. Thus when switch 18 is closed by the buoyancy of the water displaced by rod 16 a gate signal is developed to the SCR 46 exciting coil 44. When coil 44 is excited relay assembly 43 is pulled open cutting off power to the outlet 33. Coil 44, however, is tied in circuit with switch 23 to the SCR 46 and thus when this circuit is opened power is restored to outlet 33. At the same time switch 18 is hooked in parallel with a test switch 22.

In addition to the foregoing sensors a moisture switch 52 may be connected across switch 18 and any of the devices 52, 22 and 18 provide the necessary connection to the gate terminal of SCR 46 to open the circuit to plug 33. Moisture sensor 52 may be any conventional moisture sensing device or resistive device which reduces in impedance upon immersion in water, the change in impedance being dependent on the total impedance of the voltage divider made up of resistors 47 and 48, or may be formed according to the description following.

Thus by deploying the moisture sensor 52 underneath the appliance A and suspending the weighted level sensor 16 in the stand pipe 11 all of the conditions which normally lead to spillage are sensed. Each one of the conditions, when arranged in the circuit herein, provides a signal to gate SCR 46 either singly or in combination. Furthermore, the output of any one of these parallel sensors may be tied to the input terminals of a timer 60 generally conformed as a 555 Model Series Timer now conventionally available. Timer 60 may be tied by its output to the audio alarm 31 which will thus be excited for a duration set in the timer by the associated capacitors connected thereto.

It is to be understood that the foregoing combination of parts may be variously implemented. For example as shown in FIG. 5 a level sensor may be conformed by way of a flexible hose 115 which is inserted, in substitution, for the tube 15. Hose 115 may be tied to a pressure sensing cavity comprising a spherical enclosure 116 separated by a flexible membrane 117. Membrane 117, by way of a pin 119 supported thereon may articulate a switch 118 which is configured exactly like the switch 18 in FIG. 3. This latter form of a level sensor utilizes the pressure build-up that occurs as result of the water rise in stand pipe 11 and will thus clip switch 118 upon the occurrence of an obstruction.

As shown in FIGS. 10 and 11 this pressure sensing level detector 116 may be installed directly in the appliance A with the hose H being provided with a tee connection 125 through which the flexible hose 115 is conveyed. Flexible hose 115 may then be passed on the interior of hose H to emerge at the end thereof to the depth of the water level to be sensed. Similarly the enclosure 30 may be installed into the appliance A forming a single structure which is now protected against overflow and leakage.

As a further alternative water level may be detected in the stand pipe 11 by way of the sensor shown in FIG. 7. As shown in this figure one side of a dual strand wire 215 is extended into the interior of the stand pipe 11; the other side being attached to a clip 216 grasping the stand pipe. The strands of the wire 215 may be connected to the terminals of switch 18 affecting a switch closure when water bridges the gap therebetween. The same bridging effect of water may be utilized to advantage in implementing the moisture sensor 52. More specifically, as shown in FIG. 8 moisture sensor 52 comprises a stratum of dielectric material 252 having deposited thereon two comb-like interspaced electrodes 253 and 254. Any water droplets bridging these electrodes will produce the necessary impedance drop to gate SCR 46.

As a further feature enclosure 30 may be provided with a dual set of male plug terminals 230, as shown in FIG. 9. This dual set of male terminals, when inserted into the wall receptacle W, provide the requisite structural support to affect a reliable deployment of the housing.

Obviously many modifications and changes may be made to the foregoing description without departing from the spirit of the invention. It is therefore intended that the scope of the invention be determined solely on the claims appended hereto.

What is claimed is:

1. In an appliance adapted to be powered by an electrical outlet and conformed to receive from a water supply predetermined amounts of water at automated first intervals and to drain into a drainage system said amounts of water at automated second intervals, the improvement comprising:

a stand pipe interposed between said appliance and said drainage system and aligned in a substantially vertical direction above said drainage system, for conveying said amounts of water therethrough;

a displacement weight suspended in said stand pipe from a spring loaded switch and conformed to articulate said switch upon immersion in water for producing a switching signal indicative of the collection of liquids in said standpipe above a selected level;

interrupting means interposed between said appliance and said electrical outlet and connected to receive said switching signal for disrupting the receipt of electrical power upon the occurrence of said switching signal; and moisture sensing means deployed subjacent said appliance and connected in parallel with said switching signal for disrupting said electrical power upon the leakage of water thereupon.

* * * * *